United States Patent Office 3,447,783
Patented June 3, 1969

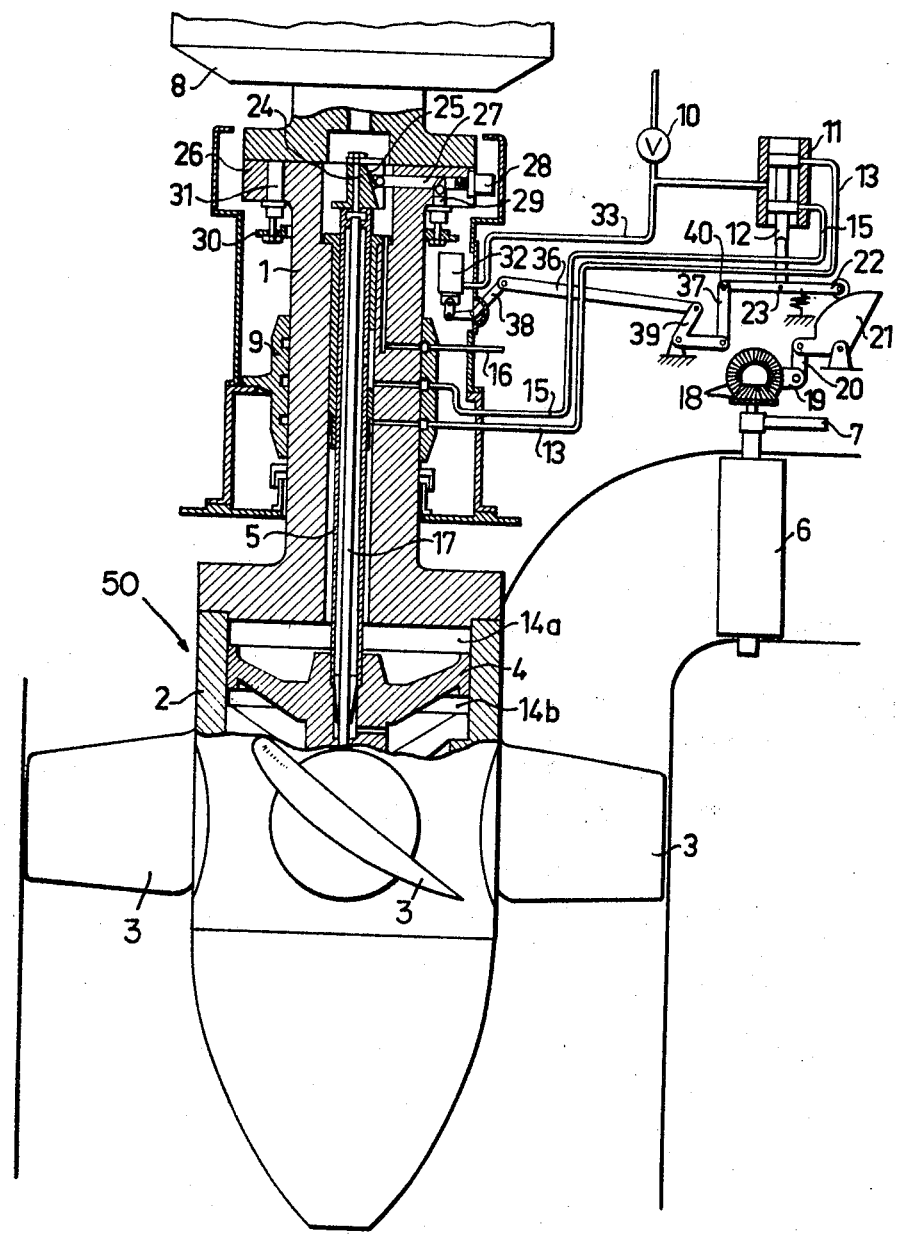

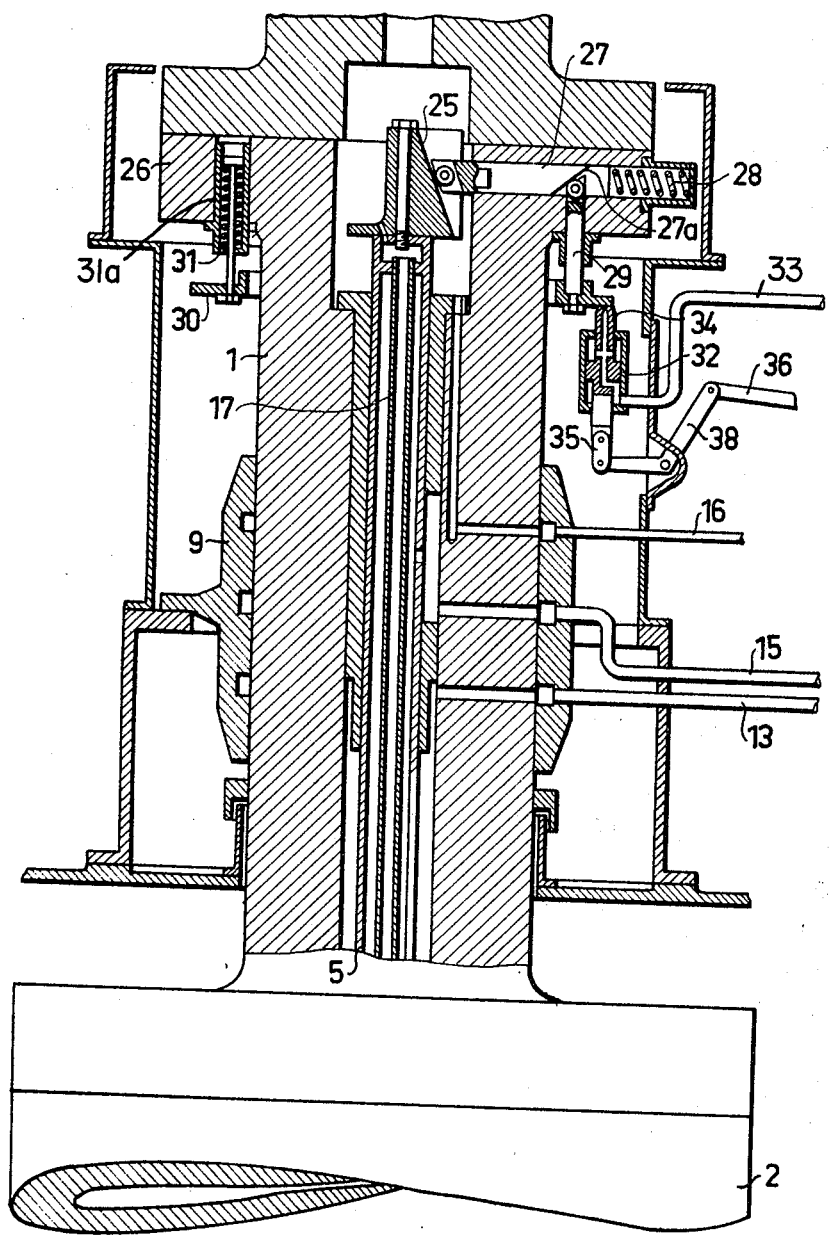

3,447,783
DEVICE FOR TRANSLATING THE POSITION OF AN ELEMENT AXIALLY DISPLACEABLE IN A ROTATABLE SHAFT
Svante Helmer Wijkander, Trollhattan, Sweden, assignor to Nydqvist & Holm Aktiebolag, Trollhattan, Sweden, a corporation of Sweden
Filed June 14, 1966, Ser. No. 557,399
Claims priority, application Sweden, June 15, 1965, 7,902/65
Int. Cl. F01d 7/00, 17/26
U.S. Cl. 253—122
8 Claims

ABSTRACT OF THE DISCLOSURE

There is disclosed a device for controlling the load and the r.p.m. of a turbine the runner blades of which are controlled by wicket gates. The device comprises a runner blade assembly including a hollow rotary shaft mounting a hollow hub which, in turn, pivotally supports the runner blades. The piston of a servomotor within the hub is displaceable in the direction of the axis of the shaft and is coupled with the runner blades to control the pivotal position thereof by the lengthwise position of the piston. The wicket gates are coupled to the piston to maintain a predetermined angular relationship between the pivotal position of the runner blades and the wicket gates. The coupling between the runner blades and the wicket gates is effected by feeding pressure fluid to one or the other side of the piston to control the axial position thereof in reference to the shaft. The flow of pressure fluid is controlled by a valve which, in turn, is controlled by the angular position of the wicket gates so as to cause pivoting of the runner toward angular positions corresponding to the angular positions of the wicket gates. The position of the piston and the valve are further controlled for moving the same into a predetermined neutral position when the angular positions of the wicket gates and the runner blades correspond to each other. The control valve when in its neutral position interrupts the flow of pressure fluid to the servomotor thereby arresting movement of the piston and thus the pivotal movements of the runner blades.

---

The present invention relates to a device for translating or transmitting the position of an element, axially displaceable in a rotatable shaft, to a member located outside said shaft.

For a variety of reasons certain purchasers of turbines have specified that the delivery of hydraulic oil to the servomotors for adjusting the blades and the control of servo piston movements in turbine plants should be carried out below the generator instead of at the top of the same. It is necessary that the movement of the servo piston is capable of being transmitted to members located outside the turbine shaft, among other things for the purpose of placing the position of the member under the control of the control valve of the servomotor and to limit the extent to which the turbine can overspeed. This problem is of particular significance in the construction of propeller-type turbines.

The object of the present invention is to provide a solution to the above mentioned problem, with respect in general to rotatable shafts and more specifically with respect to turbines. The object is achieved with the position transmitting or translating device according to the invention as defined in the claims constituting part of the application.

The invention will be described more in detail in connection with the accompanying drawings, where FIG. 1 shows diagrammatically, partly in vertical section, a propeller-type turbine provided with a device according to the invention and FIG. 2, in vertical section and on a larger scale, illustrates a part of the same turbine.

Shown in the drawings is a propeller-type turbine provided with a shaft 1, a runner hub 2 and blades 3. A servomotor 50 is arranged in the runner hub for the purpose of adjusting the blades, a piston 4 of said servomotor being supported by a rod or tube 5 which follows the piston in its movement. The flow of water to the turbine is regulated by means of wicket gates 6 incorporated in a gate mechanism, the wicket gates being adjusted by means of a gate operating ring (not shown) via wicket-gate cranks 7.

The pressure oil which operates the servomotor is delivered and discharged below a generator 8, driven by the turbine. For this reason an oil distributor head 9 is arranged around the turbine shaft 1. Oil is passed from the pressure oil source (not shown) through a shut-off valve 10 and a control valve 11 having an axial slide 12 to a conduit 13 through which the oil is passed through the oil distributor head 9 to the opening side 14a of the servomotor piston, or to a conduit 15, through which the oil is passed to the closing side 14b of the servomotor piston. Conduit 15, which for the time being is not connected to the pressure oil source, is connected to outlets. A drainage conduit 16 communicates with a central tube 17 which equalizes, among other functions, changes in the volume in the oil cavity of the hub upon adjustment of the blades.

Adjustment of the blades is made in accordance with the setting of the wicket gates. Consequently the control valve 11 is controlled by the wicket gates in such a way that said gates are operatively connected, via gears 18, a crank 19 and a link 20, with a cam disc 21 against which one end, provided with rollers, of a balance bar 22 rests with spring force, the balance bar 22 being connected at a point 23 with the axial slide 12 in the control valve 11 by means of a link. The other end 40 of the balance bar is connected to a movement translating mechanism which, in turn, is connected to a position translating or transmitting device for the servomotor piston 4 for the purpose of transmitting the position of the piston to the control valve.

The position translating device is designed in the following way. Secured on the tube 5 is a body 24 which has a conical surface of circularly curved cross section or which, in this case may, as be provided with grooves having uniform or unequal pitch at their bases 25, each of said bases constituting a cam surface. The most essential feature is that each base 25 defines an angle with the lengthwise axis of tube 5. Abutting the bases 25 are a number, one for each groove, of radially movable pistons or slides 27 arranged in the flange 26 of shaft 1, the pistons being forced against the bases 25 by means of springs 28. Each of the pistons is provided with a groove having a bottom surface 27a inclined towards the shaft, an axially directed rod 29 abutting said bottom surface 27a under spring force. The axial rods are secured in a ring 30 surrounding the shaft 1, the ring thus rotating with the shaft and being supported by springs 31 arranged in sleeves 31a in the flange 26. The dimensions of the springs are such that they will support the weight of the ring and the axial rods 29 connected thereto and in addition apply to rods 29 the necessary abutment force against the surfaces 27a of the radial pistons 27.

The position of the servomotor piston 4 which is thus transmitting or translated to the ring 30 is sensed by a follower member 32 which follows the ring in its axial movement. The follower member may be constituted of any mechanical, electrical, pneumatic or hydraulic member whatsoever, but in this case constituted by a hydraulic relay. Relay 32 is connected, by means of a conduit 33, to the same oil pressure source as the control valve 11. The piston 34 of the hydraulic relay sluggishly follows the ring 30, in a manner known per se, at a distance of approximately 1/100 mm. and is connected to the previously mentioned movement translating mechanism connected to the balance bar 22. The mechanism comprises the links 35, 36 and 37 and the bell crank levers 38 and 39, link 37 being hinged to balance bar 22 at 40.

The position control device of the invention functions in the following manner. The cam disc 21 is assumed to rotate anti-clockwise on the opening movement of the gate mechanism, the balance bar 22 rotating around the point 40, stationary for the moment, and moving the slide 12 in the control valve 11 upwards. The conduit 13 is thus connected to the oil pressure source via conduit 33 and the conduit 15 with the outlet. Pressure oil is now passed through oil distributor head 9 to the opening side 14a of the servomotor at the same time as its closing side 14b is connected to the outlet via the tube 5 secured to the piston, the oil distributor head 9 and the control valve 11. When the piston 4 moves downwards the blades 3 connected to their rods are rotated, thereby providing a larger opening. As soon as the piston 4 passes downwards the control device becomes effective; the tube 5 follows the piston 4 downwards; the radial piston 27 abutting the body 24 moves radially inwards by the action of spring 28; the axial rods 29 move upwards the ring 30 being carried along with the rods; the relay piston 34 sluggishly follows the ring and moves the link 35 upwards; the bell crank lever 38 rotates clockwise; the link 36 moves to the right and rotates the bell crank lever 39 clockwise; the link 37 moves downwards and rotates the balance bar 22 anti-clockwise around the roller 22 abutting the cam disc 21; the slide 12 is moved downwards to reclose oil feed conduit 13 whereby the movement of the servomotor piston is stopped. When closing the blades the arrangement functions in a corresponding manner but all movements are reversed.

The described arrangement also functions as an overspeed restriction device. Should the number of revolutions of the turbine shaft exceed a selected value by a predetermined number of revolutions the springs 28 together with the excess force from the springs 31 cannot hold the pistons 27 forced against the bases 25. By suitably selecting the springs and suitable adjustment of the same the pistons are forced somewhat outwardly due to the actuation of the centrifugal force. This results in that the pistons 29 and the ring 30 move downwards. In the manner previously described the control valve 11 is now actuated, the slide 12 being moved upwards, thereby connecting feed conduit 13 to the oil pressure through conduit 33. As a result, the blades open independently of the position of the wicket gates and the speed of the turbine is reduced. When the number of revolutions is reduced to the selected value, pistons 27 return into contact with the bases 25 and the described mechanism once again functions normally as a blade-positioning device.

The invention is naturally not restricted to the described embodiment in water turbines. The rotating shaft need not, for instance, be vertical and the enclosed axially displaceable element need not be rotatable with the shaft 1.

I claim:

1. A control device for controlling a receiver in accordance with the position of a movable member located separately from the receiver, said control device comprising, in combination, a hollow rotary shaft; a control member lengthwise displaceable within said shaft; receiving means disposed outside said shaft and physically separate therefrom; a cam member having a cam surface defining an angle with the axis of said shaft and supported by said member movable in unison therewith; a slide transversely movable in reference to the shaft axis and engageable on one end with said cam surface; a first yieldable directional force means urging said slide into engagement with said cam surface, said slide having on its other end a cam surface also defining an angle with the shaft axis; a rod supported parallel to the shaft axis and lengthwise displaceable; a second yieldable directional force means urging one end of said rod against the cam surface of the slide, the transverse position of said slide in reference to the cam surface of said cam member being controlled by the lengthwise position of said control member in reference to the shaft and controlling the lengthwise position of said rod, and transmission means operatively coupling said rod with said receiving means for controlling the latter in accordance with the lengthwise position of the rod.

2. A control device according to claim 1 and comprising a ring member secured to said rod for joint movement therewith lengthwise of the shaft axis, said second directional force means coacting with said ring member to urge the rod against the cam surface of the slide.

3. A control device according to claim 1, wherein said control member is secured against rotation in reference to said shaft, and wherein said cam member has at least a partly conical configuration and is mounted on said control member in alignment with the lengthwise center axis thereof.

4. A control device according to claim 1 and comprising a ring member secured to said rod for joint movement therewith lengthwise of the shaft, said second directional force means including a spring secured to the shaft and holding said ring member in suspension, said spring having a springy force sufficient to support the combined weight of the ring member and of the rod to urge the latter into engagement with the cam surface of the slide.

5. A device for controlling the load and r.p.m. of a turbine having at least one pivotal runner blade and at least one wicket gate coacting with the runner blade for varying the angular position thereof, said device comprising, in combination, a runner blade assembly including a hollow rotary shaft mounting a hollow hub on one end and at least one runner blade pivotally supported by the hub; at least one angularly movable wicket gate for controlling the flow of a driving fluid to the runner blade; a servomotor means within said hub, said servomotor means including a cylinder and a piston displaceable in the direction of the shaft axis and coupled with said runner blade to control the pivotal position thereof by the lengthwise position of the piston; and transmission means coupling said wicket gate to said piston to maintain a predetermined angular relationship between the pivotal position of the runner blade and the wicket gate, said transmission means including a conduit for feeding a pressure fluid to one side of said piston and for discharging pressure fluid from the other side thereof to control the position of the piston in the cylinder and thus of the runner blade; a control valve connected to said conduit for controlling the flow of pressure fluid therethrough; first control means controlled by the angular position of said wicket gate and controlling said valve for causing pivoting of the runner blade toward an angular position corresponding to the angular position of the wicket gate; and second control means controlled by the position of the piston and also controlling said valve for moving the same into a predetermined neutral position when the angular positions of the wicket gate and the runner blade correspond to each other, the control valve in said neutral position interrupting the flow of pressure fluid to the servomotor means, thereby arresting the movement of said piston and thus the angular movement of said runner blade, said first control means including a movable cam member having a cam surface and being coupled to said wicket gate for movement in unison therewith, and a movably mounted control bar coupled to said control valve to control the position thereof and engaged with said cam surface for control of the position of the bar by the position of said cam member, and said second control means including a cam member having a cam surface and being coupled to said piston for movement in unison therewith; a slide transversely displaceable in reference to the axis of the shaft, one end of said slide constituting a follower engaging the cam surface of the cam member of the second control means and the other defining a cam surface, whereby the transverse position of the slide in reference to the shaft is a function of the position of the piston; a lengthwise displaceable control rod engaging said cam surface of the slide; and coupling means coupling said control rod to said control bar for the control valve to move the latter into said neutral position in response to the piston reaching a lengthwise position corresponding to the angular position of the wicket gate.

6. A device according to claim 5, wherein said coupling means comprise a ring member supported by said control rod for movement in unison therewith, a second control valve having a piston slidable therein, said piston of the second control valve being linked to said ring member for movement in unison therewith, and linkage means coupling said piston of the second control valve to the control bar of the first control valve to control the position of said control bar by the position of said ring member.

7. A device according to claim 6 and comprising first spring means biasing said slide against the cam surface of said cam member of the second control means, and second spring means biasing said control rod against the cam surface of the slide.

8. A device according to claim 7, wherein said second spring means are secured on one end to said shaft and hold said ring member in suspension, said first and second spring means being mutually so correlated that said first spring means bias said slide into engagement with the cam surface of said cam member of the second control means below a predetermined maximal r.p.m. of said rotary shaft against the centrifugal force acting upon the slide but permit an outward displacement of the slide in response to an r.p.m. of the shaft above said maximal value, said outward movement of the slide causing actuation of the second control means for pivoting the runner blade into the opening direction independently of the momentary angular position of the wicket gate, thereby correspondingly reducing the r.p.m. of the rotary shaft.

References Cited

UNITED STATES PATENTS

| | | | |
|---|---|---|---|
| 2,801,068 | 7/1957 | Dériaz | 253—143 X |
| 2,824,716 | 2/1958 | Voaden | 253—31 X |
| 3,030,070 | 4/1962 | Krauss | 253—31 |
| 3,118,281 | 1/1964 | Gros | 253—31 X |
| 3,130,955 | 4/1964 | Sproule | 253—31 |
| 3,229,771 | 1/1966 | Hedberg | 170—160.32 |
| 2,840,344 | 6/1958 | Stage | 253—143 |
| 2,986,646 | 5/1961 | Ding | 253—143 X |

FOREIGN PATENTS

| | | |
|---|---|---|
| 901,304 | 10/1944 | France. |
| 924,439 | 4/1963 | Great Britain. |
| 757,575 | 9/1956 | Great Britain. |
| 150,901 | 7/1955 | Sweden. |

EVERETTE A. POWELL, JR., *Primary Examiner.*

U.S. Cl. X.R.

170—160.32; 253—31, 143